Figure 1:
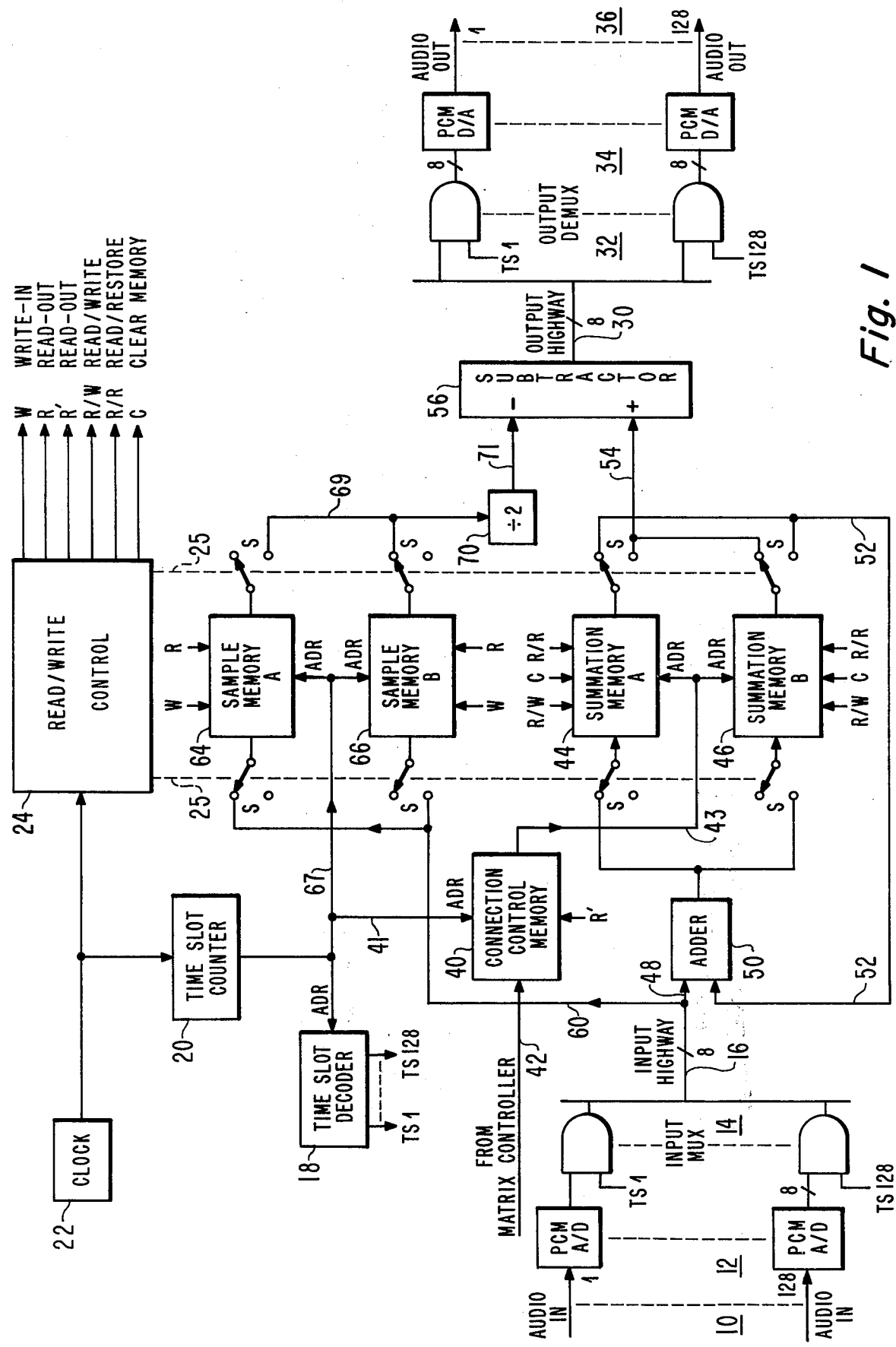

United States Patent [19]

Nahay

[11] 4,119,807
[45] Oct. 10, 1978

[54] DIGITAL TIME DIVISION MULTIPLEX SWITCHING SYSTEM

[75] Inventor: Lawrence Paul Nahay, Cinnaminson, N.J.

[73] Assignee: RCA Corporation, New York, N.Y.

[21] Appl. No.: 806,284

[22] Filed: Jun. 13, 1977

[51] Int. Cl.$^2$ ............................................. H04M 3/56
[52] U.S. Cl. ............................ 179/18 BC; 179/15 AP
[58] Field of Search ..................................... 179/18 BC

[56] References Cited

U.S. PATENT DOCUMENTS

| 3,903,372 | 9/1975 | Aro | 179/18 BC |
| 4,007,338 | 2/1977 | McLaughlin | 179/18 BC |

*Primary Examiner*—William C. Cooper
*Attorney, Agent, or Firm*—M. Christoffersen; Samuel Cohen; Carl V. Olson

[57] ABSTRACT

A pulse code modulation (PCM) time division multiplex (TDM) telephone exchange to which $n$ telephone lines are sequentially connected during $n$ respective sequential time slots. An unlimited number of phones may be connected together for conference purposes by means of a summation memory in which each conference storage location is used for accumulating the sum of message samples from one or more lines during a write-in cycle and supplying the sum of the message samples to one or more of the lines during a subsequent read-out cycle. The summation memory is indirectly addressed by a connection control memory. A portion of each message sample stored in a sample memory is subtracted from each sum of message samples read out during the same time slot from the summation memory, so that a speaker hears an attenuated sidetone version of his own voice.

5 Claims, 2 Drawing Figures

| TIME SLOTS | 1 | 2 | 3 | 4 | 5 | --- | 128 | | 1 | 2 | 3 | 4 | 5 | --- | 128 | | 1 | 2 | 3 | 4 | 5 | --- | 128 | | 1 | 2 | 3 | 4 | 5 | --- | 128 |
|---|---|---|---|---|---|---|---|---|---|---|---|---|---|---|---|---|---|---|---|---|---|---|---|---|---|---|---|---|---|---|
| | ←—— CYCLE 1 ——→ | | | | | | | | ←—— CYCLE 2 ——→ | | | | | | | | ←—— CYCLE 1 ——→ | | | | | | | | ←—— CYCLE 2 ——→ | | | | | | |
| SAMPLE MEMORY A | W | W | W | W | W | --- | W | | R | R | R | R | R | --- | R | | W | W | W | W | W | --- | W | | R | R | R | R | R | --- | R |
| SAMPLE MEMORY B | R | R | R | R | R | --- | R | | W | W | W | W | W | --- | W | | R | R | R | R | R | --- | R | | W | W | W | W | W | --- | W |
| CONNECTION CONTROL MEMORY | R | R | R | R | R | --- | R | | R | R | R | R | R | --- | R | | R | R | R | R | R | --- | R | | R | R | R | R | R | --- | R |
| SUMMATION MEMORY A | C R/W | R/W | R/W | R/W | R/W | --- | R/W | | R/W | R/W | R/W | R/W | R/W | --- | R/W | C | R/R | R/R | R/R | R/R | R/R | --- | R/R | | R/R | R/R | R/R | R/R | R/R | --- | R/R |
| SUMMATION MEMORY B | R/R | R/R | R/R | R/R | R/R | --- | R/R | | R/W | R/W | R/W | R/W | R/W | --- | R/W | | R/R | R/R | R/R | R/R | R/R | --- | R/R | C | R/W | R/W | R/W | R/W | R/W | --- | R/W |

Fig. 2

DIGITAL TIME DIVISION MULTIPLEX SWITCHING SYSTEM

The United States Government has rights in this invention pursuant to Contract No. N0024-75-C-5027, awarded by the Department of the Navy.

The most common current practice in telephone communication systems generally is to establish a solid connection between a calling line and a called line via a path which is associated individually and uninterruptedly with the connection for the duration of the call. Thus, a quantity of equipment, dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, time division multiplex (TDM) communication systems have been developed which operate on a time division basis in which a number of conversations share a single spatial communication highway or bus. Privacy of conversation is assured in such systems by the division or separation of individual conversations in time. Thus each conversation is assigned to the common spatial highway for an extremely short, periodically recurring interval, called a time slot, and the connection between any two lines in communication is completed only during the assigned interval or time slot. Samples which retain essential characteristics of the voice or other signal are transmitted over the common highway in these time slots and are utilized in the called line to reconstruct the original signal.

Telephone systems normally include means providing a sidetone feature whereby a person speaking into a telephone instrument hears an attenuated version of his own voice. Conferencing means are also provided to permit a limited number of persons at different locations to speak to and hear each other. The means providing these features in a TDM system involve circuits which must be duplicated for every telephone line connected to the telephone exchange. These duplicated circuits used on the usual pulse amplitude modulated (PAM) time division multiplex (TDM) systems are not unduly expensive to provide.

There is a trend toward the use of digitized voice signals (instead of analog voice signals) in communications equipment generally, including in private automatic branch exchange (PABX) and military and government telephone equipment. Such telephone exchanges may include means to translate received analog voice signals to pulse code modulation (PCM) digital voice signals for application to the TDM exchange or matrix, and means to translate outgoing PCM digital voice signals to analog voice signals. It is found that, in the case of known pulse code modulation (PCM) time division multiplex (TDM) telephone exchanges, the cost of providing equipment for every line to accomplish the conferencing and sidetone functions is substantial. Accordingly, there is a need for a PCM TDM telephone exchange so organized as to permit the accomplishment of unlimited conferencing with economical centralized equipment not multiplied in number and cost by the number of lines connected to the exchange.

According to an example of the invention, a time division multiplex telephone exchange includes a summation memory in which each conference storage location is used for accumulating the sum of message samples from one or more lines during a write-in cycle and supplying the sum of the message samples to one or more of the lines during a subsequent read-out cycle.

In the drawing:

FIG. 1 is a block diagram of a telephone exchange constructed according to the teachings of the invention; and FIG. 2 is a timing chart which will be referred to in describing the operation of the telephone exchange of FIG. 1.

FIG. 1 shows an example of a pulse code modulation (PCM) time division multiplex (TDM) telephone exchange to which 128 telephone lines are connected. One hundred and twenty-eight audio input lines represented at 10 are connected to a corresponding 128 pulse code modulation analog-to-digital converters represented at 12 and 128 time slot "and" gates constituting an input multiplexer represented at 14, all "and" gates having outputs connected to an input 8-conductor highway 16. The analog-to-digital converters 12 convert the audio input signals to 8-bit pulse code modulation digital signals on eight respective conductors. Each of the "and" gates in the input multiplexer 14 is enabled by a respective timing pulse representing a respective time slot assigned to the respective one of the 128 audio telephone lines.

The time slot pulses TS1 through TS128 are supplied from a time slot decoder 18 which decodes the output of a time slot counter 20. Counter 20 counts the output of a master clock 22. A read/write control circuit 24 is also synchronized in its operation by the clock 22. The timing means including the components 18, 20, 22 and 24 establish 128 time slots for signal samples from a respective 128 telephone lines, and control the operation of memories to be described which accumulate signal samples from the lines and distribute the samples to the same and other lines.

Pulse code modulated output signals from the telephone exchange are directed over an 8-conductor output highway 30 to the inputs of 128 "and" gates constituting an output demultiplexer designated 32. The 128 gates are enabled by 128 respective time slot pulses from the decoder 18. Output signals from the demultiplexer 32 occurring in time sequence are then applied through pulse-code-modulation digital-to-analog converters designated 34 to 128 respective audio output lines designated 36. The 128 audio output lines at 36 are individually coupled to respective ones of the 128 audio input lines represented at 10 by means of circuits insuring the desired directional propagation of the signals and preventing oscillatory feedback disturbances.

The means by which desired ones of the 128 input lines 10 are connected with desired ones of the 128 output lines 36 includes a connection control memory 40 which has 128 storage locations which are addressed sequentially over line 41 from the time slot counter 20. The 128 storage locations in the connection control memory 40 are filled and changed from time to time from a matrix controller (not shown) over lines 42. If, for example, it is desired to connect audio input line 1 with audio output line 128, the matrix controller causes the same memory address to be stored in the first memory storage location in memory 40 and also in the 128th memory storage location. The address stored in the two locations in memory 40 is the address of a suitable location in a summation memory having a part A designated 44 and a part B designated 46.

Pulse code modulation samples of input audio signals numbered 1 through 128 are sequentially available on the input highway 16 and are applied to an input 48 of an adder 50. The output of adder 50 is applied through contacts of a cycle switch S to one or the other of summation memories A and B designated 44 and 46, respectively. Digital message samples read out from the summation memories are passed through the cycle switch and through a path 52 to a second input of the adder 50. The summation memories operate in a manner, as will be described in greater detail, such that a message sample in a storage location in the summation memory is read out and added to an incoming message sample in the adder 50, and the sum is then stored in the same memory location in the summation memory.

The connection control memory 40 and the summation memory 44, 46 are controlled by the read/write control 24 unit having identified outputs connected to the correspondingly-identified inputs of the memories. Summation memory A designated 44 is operated during a first cycle in a read/write mode R/W, while the summation memory B designated 46 is operated in a read/restore R/R mode. During a second alternating cycle, the modes of the summation memories A and B are transposed.

Two summation memories are provided and operated in an alternating fashion when the number of telephone lines connected to the telephone exchange is so large that the time slots allocated to each telephone line are very short compared with the read/write cycle time possible using existing memories. On the other hand, the two summation memories may be replaced by a single summation memory if the available single memory is capable of sufficiently fast operation to perform the required functions within the time available.

The output of one summation memory during one cycle and the other summation memory during the following cycle is conveyed over a line 54 to a subtractor 56. The output of subtractor 56 is applied via the output highway 30 and through the output demultiplexer 32 and digital-to-analog converters 34 to intended ones of audio output lines 1 through 128.

The audio input message samples on the input highway 16 are also applied over an 8-conductor line 60 and through contacts of cycle switch S to alternately one and then the other of a sample memory A designated 64 and a sample memory B designated 66. While two sample memories A and B are shown and described, it will be understood that a single sample memory may be employed if memories available for the purpose are capable of a sufficiently fast read and write operation to accommodate the number of telephone lines connected with the telephone exchange. The 128 storage locations in the sample memory A and the sample memory B are sequentially addressed over line 67 from the time slot counter 20. The sample memories A and B receive write-in W and read-out R control signals from the read/write control unit 24. Message samples read out from sample memories A and B through contacts of cycle switch S are applied over lines 69 to a divider 70 which may divide the receive signal by two. The output of divider 70 is applied over line 71 to the subtractor input of the subtractor unit 56. The construction is such that signal samples sent out via the output highway 30 to the telephone of a person who is speaking have the speaker's voice reproduced in his own instrument at reduced amplitude for the purpose of providing a sidetone feature by which a speaker hears an attenuated version of his own voice.

The outputs of the timing system including the time slot decoder 18, the time slot counter 20, and the read/write control unit 24 are shown in the timing diagram of FIG. 2. It is seen in FIG. 2 that during each of the alternating cycles 1 and 2 that the time slot counter 20 provides successive time slot addresses going from 1 to 128. The time slot decoder 18 decodes the sequential numbers and provides the time slot signals which successively enable input gates 14 and output gates 32 providing connection with the telephone lines 1 through 128.

The read/write control unit 24 acts over dashed lines 25 to operate switches S (which, of course, may be implemented in the form of transistor switches), so that when the switches S are in cycle 1 position shown, a write-in pulse W is applied to the sample memory A designated 64 at the same time that a read-out pulse R is applied to the sample memory B designated 66. At the beginning of the next cycle 2, the positions of switches S are changed. During cycle 2 a write-in pulse W is applied to sample memory B and a read-out pulse R is applied to sample memory A.

The connection control memory 40 receives sequential addresses for the time slots 1 through 128, and receives read out pulses R' from the read/write control unit 24 during every one of the 128 time slots of all of cycles 1 and 2. Every one of the 128 memory storage locations in the connection control memory 40 which correspond with one of the 128 lines which is being connected with another line contains information in the form of an address in the summation memory 44, 46.

As charted in FIG. 2, the summation memory A designated 44 receives from the read/write control unit 24 an initial clear memory signal C at the beginning of cycle 1 which operates to clear all information from the summation memory A. Thereafter, during the time slots 1 through 128 of cycle 1, the summation memory A receives read/write control signals R/W so that the memory operates to read out the contents of a storage location, and the contents are then added in the adder 50 with a received message sample, and the sum is returned into the same storage location in the summation memory.

During the following cycle 2 of the operation of the summation memory A the memory receives read-out/restore control signals R/R which cause the addressed location of the summation memory during each time slot to be read out from the memory to the subtractor 56 and then restored to the same storage location for subsequent read out during other following time slots. It is seen from the time chart of FIG. 2 that the summation memory B designated 46 operates during cycle 1 the same way that summation memory A operates during cycle 2, and vice versa.

The operation of the telephone exchange will now be described for an assumed condition in which it is desired that a three-party conference or net be established for the telephone lines corresponding with time slots 2, 4 and 6. This conference connection is determined by the storage in the connection control memory 40 at memory storage locations having addresses corresponding with telephone lines 2, 4 and 6 of an address in the summation memory 44, 46 of the same memory location having an address which is, say 1. This necessary storage of information in the connection control memory 40 is accomplished by a matrix controller (not shown) acting over lines 42.

During cycle 1, the switches S are in the positions shown in the drawing. At the beginning of cycle 1, as shown in FIG. 2, a clear memory signal C is supplied from read/write control unit 24 to the correspondingly labeled input of summation memory A designated 44. This clears information from all of the memory storage locations in the summation memory A. During time slot 1 in cycle 1, there is no audio information on audio input line 1 and no information is passed to and stored in any of the memories.

During the time slot 2, the time slot counter 20 supplies the address of storage location 2 to the sample memory A designated 64. At the same time, the audio input sample 2 is gated through the input multiplexer 14 and over the input highway 16 and the lines 60 to and through the switch contacts S to the data input of sample memory A designated 64. During this time, the sample memory A is energized by a write-in pulse W which causes the message sample to be stored in the sample memory A.

At the same time, during the time slot 2, the address 2 is supplied to the connection control memory 40, and a read-out signal R' is applied to the connection control memory from the control unit 24. The information stored in location 2 in connection control memory 40 is the address 1, which is now applied over lines 41 to the address input of summation memory A designated 44. During this time slot 2, the audio input signal from telephone line 2 is applied through the highway 16 and the adder 50 to and through the contacts of the cycle switch S to the data input of the summation memory A. The summation memory A receives a read-out/write-in control signal R/W which, after reading out what may have been in the addressed storage location, causes the message sample from telephone line 2 to be stored in the memory location 1 of the summation memory A designated 44.

During the following time slot 3, there is no information available from telephone line 3. However, during time slot 4, the audio input signal on telephone line 4 is received and stored in sample memory A in location 4, and the location 4 of the connection control memory 40 is accessed. The information stored in this location is the memory address 1 of the summation memory A designated 44. Thus, during this memory cycle 4, the summation memory A is provided with a read-out/write-in control signal R/W which causes the information from telephone line 2 which was stored in location 1 of memory 44 to be read out of the memory and passed over line 52 to an input of the adder 50. The incoming message sample on audio input line 4 is simultaneously applied to the input 48 adder 50 where it is added with the sample read out from summation memory A designated 44. The sum is then returned to the same memory location 1 in the summation memory A.

When time slot 6 occurs, a similar operation is performed in which a message sample from telephone line 6 is stored in location 6 of sample memory A, and the location 6 of connection control memory is accessed to provide the address of the location 1 in the summation memory A designated 44. The summation memory A then reads out the sum of message samples from lines 2 and 4, and adds this sum with the incoming sample from line 6 in the adder 50 and returns the sum of the message samples from all of incoming lines 2, 4 and 6 to the location 1 in the memory 44. Of course, simultaneously during time slot 6, the message sample from incoming line 6 is stored in the location 6 of sample memory A designated 64. As the system cycles through the remaining time slots 7 through 128 of cycle 1, no data is transferred.

At the beginning of cycle 2, switches S are switched from the positions shown in the drawing. The summation memory B designated 46 is cleared in preparation for the receipt of memory samples during cycle 2. However, during cycle 2, the memory sample stored in summation memory A during cycle 1 are read out and distributed to the intended audio output lines 2, 4 and 6. This is accomplished as follows:

During time slot 2 of cycle 2, the message sample stored in location 2 of sample memory A designated 64 is read out of the memory and applied over line 69 through the divider 70 into the subtractor 56. At the same time during time slot 2 of cycle 2, the second storage location in connection control memory 40 is accessed and it supplies address 1 to the summation memory A designated 44. At the same time during time slot 2, a read-out/restore control signal R/R is supplied to the summation memory A, so that the sum of samples received during the preceding cycle 1 from telephone lines 2, 4 and 6 is read out of the summation memory A over line 54 to an input of subtractor 56. One-half of the signal from the input line 2 is subtracted from the sum of message samples from lines 2, 4 and 6 in subtractor 56 and the difference is applied over the output highway 30 to the audio output line 2.

During the following time slot 4 of cycle 2 the input sample previously received from input line 4 is read out of sample memory 64, divided by 2 and applied to subtractor 56. At the same time during time slot 4, the sum of previous inputs from lines 2, 4 and 6 is read out of summation memory A to the input of subtractor 56. The difference from the subtractor is then supplied over output highway 30 and through the output demultiplexer 32 to the audio output line 4.

In a similar manner, during the time slot 6 of cycle 2 the sample previously received from input line 6 and stored in sample memory A designated 64 is read out through the divider 70 to the subtractor 56. At the same time, the location 6 in connection control memory 40 supplies the address 1 of the summation memory A designated 44 at the same time that the read-out/restore control signal R/R is applied to the summation memory 44. As a result, the sum of a previously stored samples from input lines 2, 4 and 6 is read out of summation memory A over line 54 to the subtractor 56. The output of the subtractor is then applied over the output highway 30 to the audio output line 6. The signal thus applied to the output line 6 is the sum of the signals from the input lines 2, 4 and 6 with the contribution by the sample from telephone line 6 being reduced to provide an attenuated sidetone version of the speaker's voice in the speaker's own earphone.

During cycle 2 as described, when samples are read out of the summation memory A to the output telephone lines, the summation memory B designated 46 is operating to receive and accumulate message samples from lines 2, 4 and 6.

During the next following cycle 1, switches S are returned to the positions shown. The summation memory A designated 44 is cleared by a clear memory control signal C and is then ready to receive and accumulate samples from input lines 2, 4 and 6 as previously described. At the same time, during this described cycle 1, the summation memory B designated 46 is operative during time slots 2, 4 and 6 to read out the sums of the samples stored in the memory to the output lines 2, 4 and 6 in sequence. It is thus seen that the summation memories alternately accumulate information and read out the accumulated information during alternating time cycles.

It is apparent that while the operation has been described in terms of a three-party conference or net connection between telephone lines 2, 4 and 6, that in a similar manner, any number including all of the 128 telephone lines can be connected together in a 128-party conference. Regardless of the number of parties connected together in conference, the signal samples from all of the parties is added and distributed in a manner insuring high-quality faithfully-reproduced audio signals to all of the listening lines. The use of a summation memory in a central location precludes the necessity for providing signal conference summing circuits on all of the 128 lines.

It should be clear that the sample memory A and sample memory B store a message sample for each conferencing line during its time slot and that a suitable proportion, such as one-half of the stored sample is subtracted from the total signal from the summation memory in order to provide the sidetone feature by which a speaker hears an attenuated version of his own voice. It will also be understood that the sample memory A and the sample memory B may be replaced by a single sample memory having a suitably high speed read/write operation, and that similarly, the summation memory A and the summation memory B may be replaced by a single summation memory capable of a suitably high speed of operation.

What is claimed is:

1. A TDM telephone exchange to which $n$ telephone lines are sequentially connected during $n$ respective sequential time slots, comprising
    timing means providing alternating write-in and read-out cycles of $n$ sequential memory addresses synchronized with said $n$ respective sequential time slots,
    a summation memory in which a storage location accumulates the sum of message samples from one or more lines during a write-in cycle and supplies the sum of the message samples to one or more of said lines during a subsequent read-out cycle, and
    a connection control memory for indirectly addressing said summation memory, said connection control memory having $n$ sequential memory storage locations, addressed by said sequential memory addresses from said timing means, all memory storage locations corresponding with lines to be connected together in conference containing the address of one storage location in said summation memory,
    whereby the contents of said connection control memory determines the conference connections of said telephone lines.

2. A telephone exchange as defined in claim 1, wherein said summation memory consists of two summation memories both simultaneously receiving the same addresses, and means to cause one memory to operate in a read-out cycle while the other operates in a write-in cycle.

3. A telephone exchange as defined in claim 1, and in addition,
    a sample memory having $n$ sequential memory locations addressed sequentially from said timing means to write in message samples during time slots of respective lines, and having the $n$ sequential memory locations subsequently addressed sequentially from said timing means to read out the stored message samples during time slots of respective lines, and
    means to subtract at least a portion of each message sample read out from said sample memory from the sum of message samples read out during the same time slot from said summation memory,
    whereby a speaker hears an attenuated sidetone version of his own voice.

4. A telephone exchange as defined in claim 3, wherein said sample memory consists of two sample memories both simultaneously receiving the same addresses, and means to cause one memory to operate in a read-out cycle while the other operates in a write-in cycle.

5. A telephone exchange as defined in claim 1, wherein an adder is connected to add the contents of each summation memory storage location with a message sample destined for the respective storage location and supply the sum to the respective storage location during each write-in cycle.

* * * * *